United States Patent Office 3,558,161
Patented Jan. 26, 1971

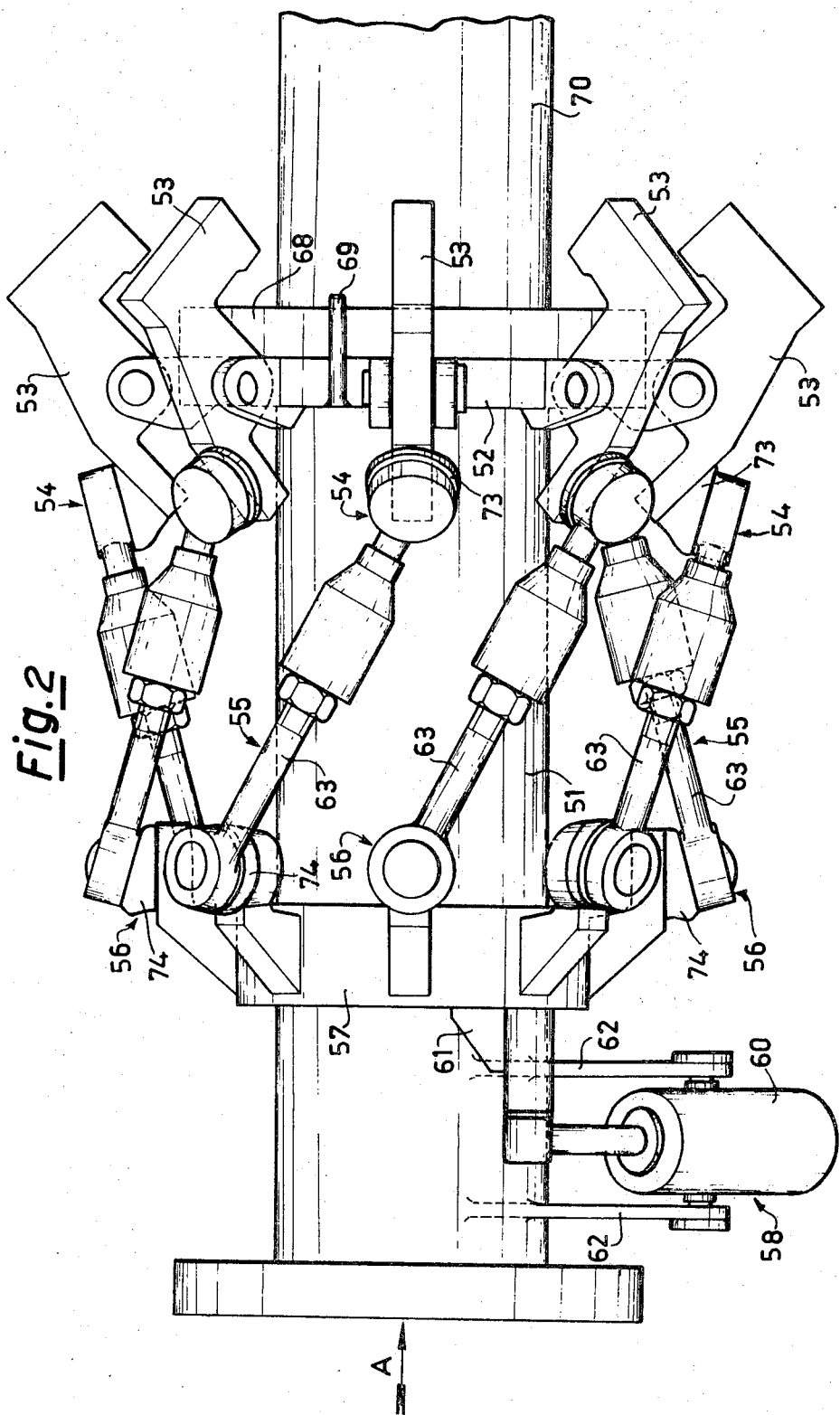

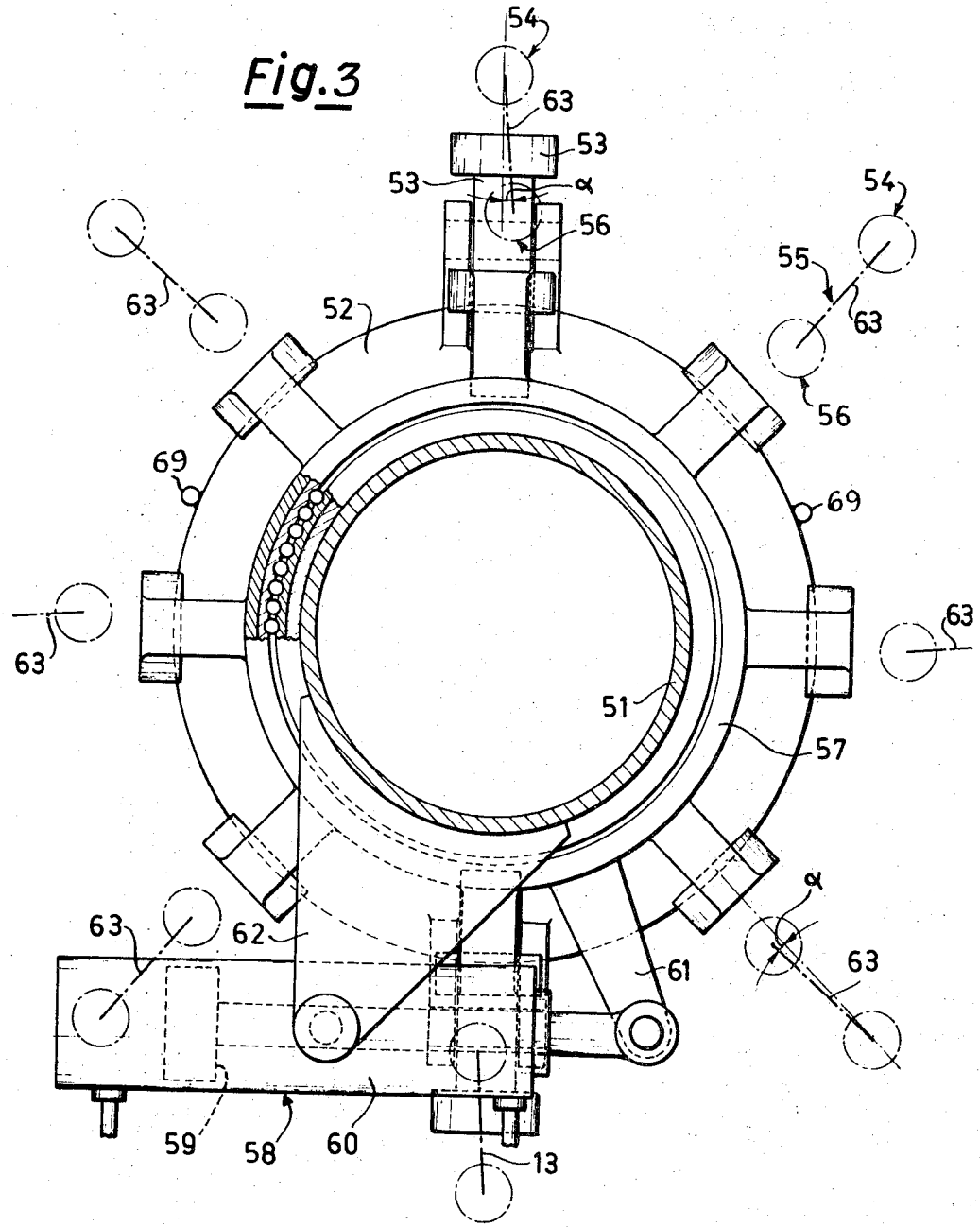

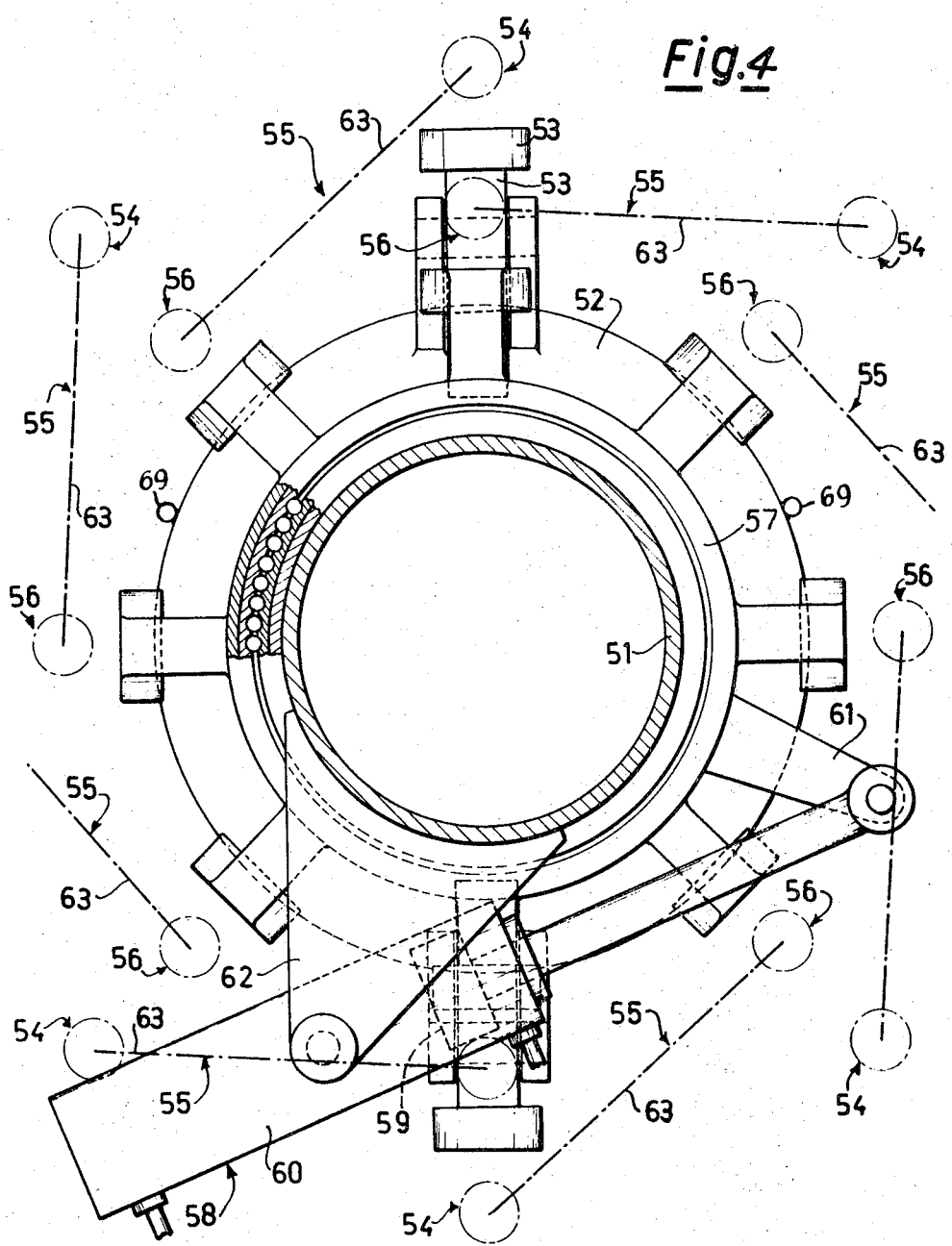

3,558,161
PIPE-CONNECTING DEVICE
Giorgio Bormioli, Via Galileo Galilei 11, Padova, Italy
Filed June 5, 1968, Ser. No. 734,819
Claims priority, application Italy, June 10, 1967,
17,065/67; May 21, 1968, 16,757/68
Int. Cl. F16l 23/00
U.S. Cl. 285—27
7 Claims

ABSTRACT OF THE DISCLOSURE

A connecting device for pipings, especially for piping on board an oil tanker and piping installed on a harbour pier, is disclosed, which permits the rapid making and undoing of a connection between said pipings. The device essentially comprises a multiple, spider-like, flange gripping mechanism which can be actuated either hydraulically or mechanically, according to two respective preferred embodiments of the invention.

The advantage of a rapid connection or disconnection of two such pipings can be appreciated especially on account of the risks of fire hazards and breakages due to rough sea and the like.

---

This invention relates to a device for connecting pipings, which is particularly suitable for connecting piping installed on board ships with a pipeline installed on a pier.

The difficulties encountered whenever fuel, for example crude oil or any other fluid, carried by a ship is to be unloaded on land are known. In general, tankers have at least a tank and a pipe section having a flange at one end. On land, that is, on the unloading pier there is another flanged piping which should be brought to contact the pipe on board so as to form a single duct for discharging the fuel. The two flanges should be brought into close contact with one another in perfect alignment so as to bring also the two pipings into alignment. The flanges must then be tightly screwed to one another in an accurate and reliable manner to prevent any possibility of undesirable disconnection or fuel leakage at the union point. On the other hand, it is imperative to be able rapidly to disconnect the two pipings in cases of any hazardous situation such as rough sea, fire and the like.

With the systems in use nowadays, the alignment and union operation of two pipings offer considerable difficulties. As a matter of fact, the tanker rolls whereas the piping on land is kept lifted by a load arm which limits the displacement. It is thus difficult to succeed in aligning the two pipings in order to unite them.

A few systems are known which facilitate said operations but still require bulky, expensive and slow-acting implementation. For example, a system is known for rapid connection which is hydraulically controlled by a single ram which controls three levers; these, having each an eccentric action, on three clamping claws. This notwithstanding, centering is not automatic with said system but takes place by utilizing three guiding members which are welded internally of the piping on land: said guides, as they protrude, enter into the piping to be connected. Matching of the pipings is not simultaneous with centering but can be completed only after the three guiding members have been introduced into the piping aboard: only under these conditions can the final closing operation be completed. In addition, a centering operation of this kind offers many difficulties and requires rather long manipulations.

The object of this invention is to provide a connecting device for pipings, especially suitable for the case in which one piping is on board ships and the other one on a pier, said device allowing quick and easy centering even under conditions of not a perfectly calm sea, and a nearly simultaneous closure of the pipings themselves. In addition, the possibility must be afforded of rapidly disconnecting the two pipings in case of danger.

According to the invention, such a pipe-connecting device comprises at least three members which are movable on different planes passing through the axis of a first flanged piping and forming equal dihedia, each of said members comprising at least a gripping portion which, at least during the ultimate part of the movement of said member, is obliquely caused to advance towards the axis and the flange so as to clamp onto said flange another flange provided on a second piping, means being provided for centering the second piping with respect to the first piping before said gripping portions clamp said flanges against one another.

In a preferred embodiment, the movable members, with their attendant gripping portions, are hinged to the flanged end of the first piping and are moved, in such a way that, during the ultimate part of their movement, the gripping portions may be advanced obliquely towards the axis or the flange of the second piping in order to clamp the two flanges together. Their movement is controlled by rods whose lengths are resiliently variable and which are hinged between said movable members and a common thrust ring which is rotatable about the axis of the first piping due to the effect of the reciprocal motion imparted thereto by a manually controlled member.

The alternating rotation of the thrust ring takes place between two end angular positions. At the first of these positions the extendable rods lie substantially on the plane of movement of the movable gripping members, whereas, at the second end angular position the extendable rods are inclined with respect to said planes. If the length of the rods is such that their resilient portion is in its inactive position in correspondence with said second angular position of the thrust ring it is obvious that, when the thrust ring is rotated to be brought to said first angular position, said rods are compressed and store such elastic energy as to cause closure of the gripping members for clamping the flanges of the pipings to be connected. A certain amount of elastic energy, however, still remains stored in the rods so as to ensure a certain holding pressure for the gripping members. If the rotation of the thrust ring is now continued slightly beyond the position in which the rods lie on the planes of movement of the gripping members, the result is that, to open the gripping members again, the thrust ring should be rotated in the opposite direction, because the force exerted by the resilient portion of the rods prevents the reopening unless said rotation is performed. The union is then fitted with a simple but effective safety device against accidental opening of the gripping members caused by possible breakages of the control member for the thrust ring.

To open the gripping members again, the thrust ring should then be rotated in the opposite direction so as to bring it to its second end angular position again. Due to this reversed rotation, the rods are inclined and thus extended and are returned to their inactive position thus causing the gripping members to be reopened. Said reopening will occur nearly instantly since it will suffice that the rods overcome the dead center (which is the position at which the rods lie in the planes of movement of the gripping members) so that the energy stored in the resilient portion of the rods is completely discharged and may pull the gripping members back, thus facilitating the return stroke of the thrust ring towards its own second end position.

To center the second piping with respect to the first, two stirrups are provided which are symmetrical and rigid with the flange of the first piping, and axially projecting therefrom.

The desired objects of perfectly centering and clamping the two pipings are achieved with the device of the invention as generally described hereinabove. More particularly a uniform tightening force is obtained along the whole circumference of the two flanges inasmuch as, by providing a plurality of rods of equal length and resiliency and mounted with even spacing, the gripping members receive an even pressure to be transferred thereby to the two flanges.

In addition, the device can easily be maintained and permits, in particular, a ready and quick opening of the gripping members and the disconnection of the two pipings is thus likewise easy and rapid. It is sufficient, in fact, appropriately to rotate the thrust ring towards its second end angular position to open the gripping members quickly and disengage the second piping from the first one.

This rapid disconnection of the gripping members will prove favorable in the case of fire hazard, rough sea or other possible emergencies. Inter alia, since it is possible to arrange the control units for the thrust ring at a remote location, the disconnection can be effected by an operator who is placed at a remote location with respect to the device proper, the risk of danger encountered by the operator being thus minimized. In the case of a remotely controllable device, a closed-loop TV monitor permits checking the operation of the device and effecting all the manipulations, which are necessary, from a cabin placed away from the pier.

In order that the features of the present invention may be fully understood, a preferred embodiment will be now described in detail, by way of example only and without any implied limitation, reference being had to the accompanying drawings, wherein:

FIGS. 1 and 2 show a side view of the preferred embodiment of the inventive device, said device being shown with its gripping members in the closed and open positions, respectively.

FIGS. 3 and 4 show said device as viewed in the direction of the arrows A of FIGS. 1 and 2, with the gripping members in the closed and open positions, respectively, the extendable rods for connecting the gripping members to the thrust ring being only diagrammatically shown.

Figure 1:
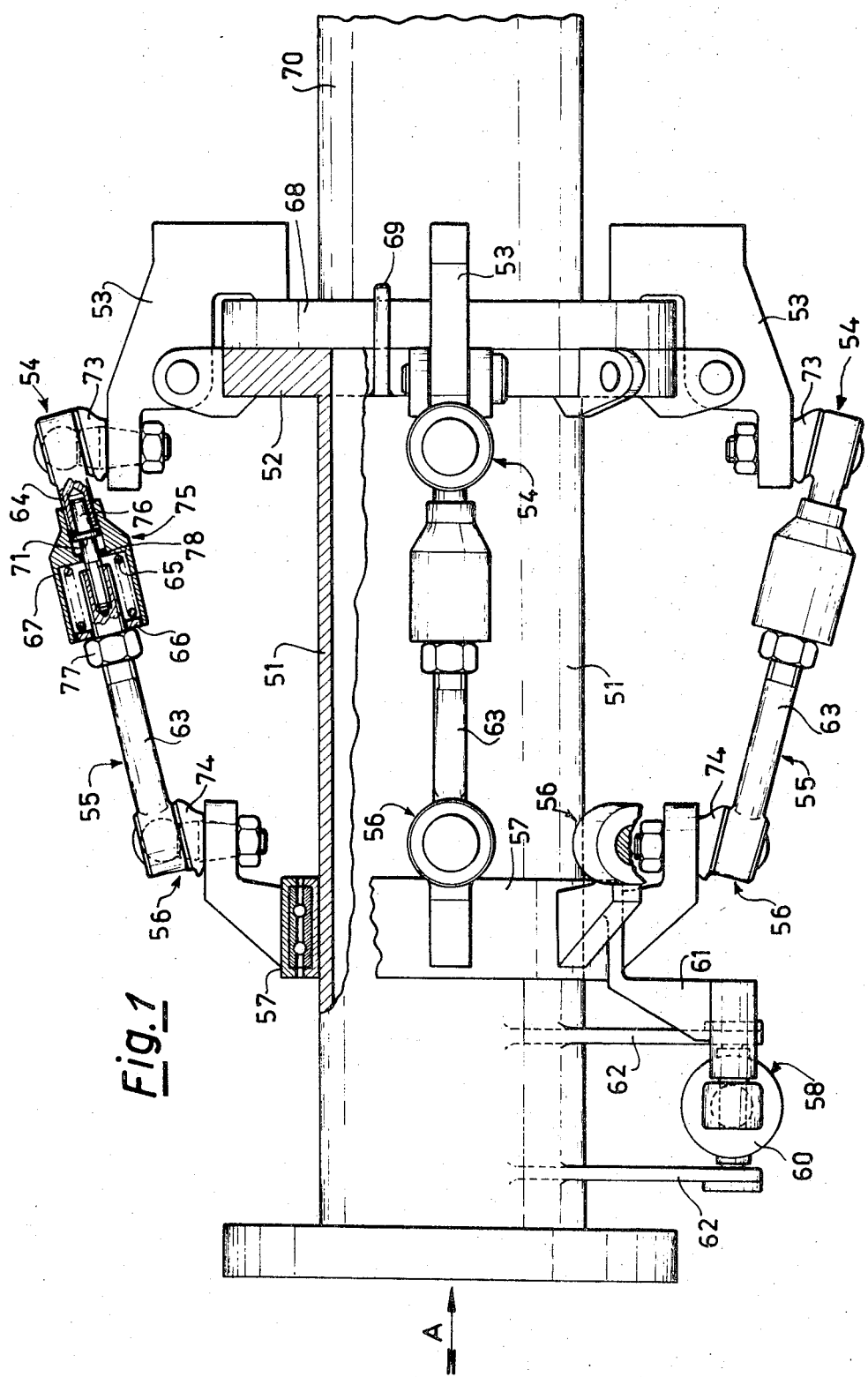

The device shown in the drawings comprises, a hollow cylindrical body 51 forming a first piping, said hollow body having a flange 52 at each end. To the flange 52 are hingedly connected eight gripping members or claws 53, equally spaced apart and movable in planes passing through the axis of the body 51 and forming equal dihedral. To each claw is connected, via a universal joint 54 having a resilient collar 73, one end of a rod 55 whose length is resiliently variable, the other ends of the rods 55 being pivoted, through universal joints 56 evenly spaced apart and having resilient collars 74, to a thrust ring 57 which is rotatable about the body 51 and is coaxial therewith. The thrust ring 57 is alternatingly rotated between two end positions, one in which the extendable rods substantially lie in the planes of movement of the claws and the other in which the rods are inclined with respect to said planes due to the tangential force imparted to the thrust ring by a hydraulic jack 58 located in a plane perpendicular to the axis of the body 51 and comprising a piston 59 and a cylinder 60. The free end of the stem of piston 59 is hingedly connected to a radial projection 61 of the thrust ring, whereas the cylinder 60 is hingedly connected in a substantially central position to stirrups 62 of the body 51. The motion of the piston 59 relative to the cylinder 60 is obtained through alternate connection of either chamber of the cylinder to a fluid feed source or to a discharge duct. Said alternate connection is preferably obtained by a hydraulic control station, not shown in the drawings, which comprises a manually actuated distribution valve.

The rods 55 comprise a first portion 63 and a second portion 64 connected to one another by a resilient joint 75; the latter comprises a sleeve 67 screwably affixed to the portion 64 and having an inner axial cavity in which the free end of the portion 63 is allowed to slide, said sliding motion being biased by a spring 65 on which a collar 66, placed about the portion 63 and thrust by a nut 77 screwed on said portion 63, is active. The portions 63 and 64 are connected, in addition, to one another by a rod 76 screwed onto the portion 63 and slidable within the position 64. A collar 71 of said rod 76 acts against an inner abutment 78 of the sleeve 67 to prevent the portions 63 and 64 from becoming separated as the rod is pulled. The length of rod which does not undergo any pulling or compressive action can thus be adjusted by virtue of the engagement between the sleeve 67 and the portion 64, and between the rod 76 and the portion 63. The amount of the maximum compression shortening can be adjusted, on the other hand, by the nut 77.

To describe the operation of the inventive device, assume that the initial conditions are those of FIGS. 2 and 4: under these conditions, the piston 59 is in its maximum advance position in the cylinder 60 and the thrust ring 57 is in its other end position, the rods 55 are inclined with respect to the planes of movement of the claws 53 with their slidable portions in the position of maximum elongation of the rods without tractive forces (the spring 65 is at rest), the claws 53 are open and no piping is applied or connected to the union.

By actuating the valve contained in the hydraulic control station to feed the jack 58 so as to send pressurized fluid (e.g. oil) to the right chamber (as viewed in FIG. 4) of the cylinder 60, the piston 59 is moved backwards and causes, with the aid of the rotation of the cylinder 60 about the point at which the latter is hinged to the projection 62 of the body 51, a clockwise rotation (still as viewed in FIG. 4) of the thrust block 57. The presence of the spherical joints 54 and 56 acts in such a way that the rotation of the thrust ring 57 causes a change of the position of the rods 55: these are thus placed in the planes of movement of the claws and compress the spring 65 so that the latter stores elastic energy. As the rods 55 reach the position in which they lie in said planes of movement of the claws, the stored elastic energy is transferred to the claws 53 which are rotated about their hinge points to the flange 52 and are closed, thus clamping against said flange 52 a matching flange 68 of a second piping 70 which had previously been brought close to the union and centered with respect to the union by symmetrical stirrups 69 welded to the flange 2 and axially protruding therefrom.

To the end of closing the claws, the thrust ring could even be stopped in the position in which the rods lie in the planes of movement of the claws; to obtain, however, a closure which is absolutely reliable against possible breakages of the control members for the jack 58, the rotation of the thrust ring is continued further so as to cause the rods to be inclined slightly in a direction opposite to the previous one. The ultimate position of the rods as the claws were in the closed position (a final position determined by the end of stroke of the piston) is shown in FIGS. 1 and 3. As can be seen, the axes of the rods form small angles "alpha" with the radii passing through the hinge points of the claws, which means that to reopen the claws the jack should be actuated in the opposite direction, and a breakage in the fluid-feeding circuit cannot in any wise produce an undesired opening of the claws.

To reopen the claws and disengage the piping 70 from the union, fluid under pressure should be fed into the left chamber (as viewed in FIG. 6) of the cylinder 60. By so doing, the piston 59 is caused to advance and produces an anticlockwise rotation (as viewed in FIG. 6 again) of the thrust ring 57.

As the dead center, corresponding to the position in which the rods lie in the planes of movement of the claws 53, is reached by the rods 55, these latter pull the claws 53 back and reopen them and the elastic energy which is still stored in the rods aids the return motion of the thrust block towards the position of FIGS. 5 and 7. As the device has been restored to the position shown in said figures, the piping 70 is freed from its engagement with the union and can easily be removed.

Inasmuch as it would be impossible to reopen the claws should the fluid feeding control station suffer from a breakage, a small manually operated pump could be put in parallel with the control station in order that said claws may be reopened in any case.

Moreover, since the flanges of the pipings which can be applied to the connecting device described above can have a variable thickness as a function of the pressure of the fluid to be unloaded, it is possible to equip the device with a system for adjusting the axial position of the thrust block so as to adjust the stroke of the claws accordingly.

Finally, for cold products (down to minus 100 centigrades) the piping 51 could have an insulating casing such as azobé wood in order to prevent the formation of ice on the outer surface of the piping. Such a formation of ice could actually hinder the operation of the clamping claws and their control and motion transferring members. Such a casing also serves as a thrust member for the applied piping.

What is claimed is:

1. A connecting device for piping, comprising at least three members which are movable in different planes passing through the axis of a first flanged-end pipe and forming equal dihedral, each of said members comprising a gripping portion which, at least during the last portion of movement of said member is obliquely advanved towards said axis and the flange of said pipe so as to clamp against said flange a flange of a second pipe, and means for centering the second pipe with respect to the first pipe before said gripping portions may clamp said flanges against one another, said movable members being hinged to the flanged end of said first pipe and a rod hinged to each movable member at one end, each rod having a resiliently variable length, the other end of each rod being hinged to a thrust ring common to all of the rods and rotatable about the axis of the first pipe by virtue of the reciprocal motion imparted thereto by a manually controlled member, said thrust ring being alternatingly rotated between two end angular positions, a first end angular position of the thrust ring corresponding to a position in which the rods lie substantially in the planes of movement of said movable members, the second angular end position of the thrust block corresponding to a position in which the rods are inclined with respect to said planes of movement.

2. A device according to claim 1, wherein said rods are inclined with respect to said planes of movement when the thrust ring is in said first end angular position, said inclination being very small and having a direction opposite to the inclination said rods have in said second angular end position of said thrust ring.

3. A device according to claim 1 wherein each rod comprises two aligned portions which are connected to one another by a resilient coupling.

4. A device according to claim 3, wherein said resilient members are in their at rest position when said thrust ring is in its second angular end position, whereas they are compressed when the thrust ring is in its first end angular position.

5. A device according to claim 1, wherein means are provided for adjusting the axial position of the thrust ring, for adjusting the length of the rods in the at rest position, and for adjusting the maximum shortening of the rods due to compression.

6. A device according to claim 1 wherein the hinged connection between the rods and the thrust ring, and to said movable members are spherical couplings.

7. A device according to claim 1 wherein said centering means consist of at least two stirrups symmetrically affixed to the flange of said first pipe and projecting in axial direction therefrom.

References Cited
UNITED STATES PATENTS

| | | | |
|---|---|---|---|
| 2,199,588 | 5/1940 | Cobham et al. | 285—(RC) |
| 2,370,354 | 2/1945 | Hurst | 285—364X |
| 2,645,506 | 7/1953 | Sturgis | 285—364X |
| 2,834,504 | 5/1958 | Annicq | 220—46 |
| 3,442,535 | 5/1969 | Frohlich | 285—320X |
| 3,445,127 | 5/1969 | Clarke | 285—27X |

FOREIGN PATENTS

| | | | |
|---|---|---|---|
| 854,763 | 11/1960 | Great Britain | 285—364 |

THOMAS F. CALLAGHAN, Primary Examiner

U.S. Cl. X.R.

285—320, 406